United States Patent Office 2,861,046
Patented Nov. 18, 1958

2,861,046

PROCESS OF FOAMING A MIXTURE OF A THERMOPLASTIC RESIN AND A BINDING AGENT

Fritz Stastny, Ludwigshafen (Rhine), Germany, assignor to Badische Anilin- & Soda-Fabrik Aktiengesellschaft, Ludwigshafen (Rhine), Rhineland-Pfalz, Germany No Drawing. Application February 6, 1957
Serial No. 638,439

Claims priority, application Germany February 24, 1956

5 Claims. (Cl. 260—2.5)

This invention relates to a process for the production of lightweight materials having as a basis thermoplastic synthetic resins.

Porous masses on the basis of thermoplastic synthetic resins are used on a large scale in industry. Various methods are used for their production, in which as a rule the synthetic resin mass which has been softened by heating is expanded by a blowing or raising agent.

It has also already been proposed to mix porous individual particles of thermoplastic synthetic resins with various binding agents or adhesives and to prepare shaped articles from these mixtures. Considerable difficulty is encountered, however, in mixing very light porous individual particles of thermoplastic synthetic resins, which often have a bulk density of only about 10 to 20 grams per litre, with the considerably heavier binding agents. A uniform coating of the porous individual particles is therefore possible—especially when using a small amount of binding agent—only after very intensive and prolonged mixing.

The object of the present invention is a process for the production of lightweight materials by means of which it is possible to convert expandable individual particles of thermoplastic synthetic resins and a solid binding agent into lightweight materials in which the expanded individual particles are surrounded by or enclosed in solid binding agent.

This object is achieved according to the present invention by mixing the expandable individual particles of a thermoplastic synthetic resin with a binding agent which is solid at room temperature and which softens at a temperature below the softening point of the thermoplastic synthetic resin and expanding the resultant mixture by heating to a temperature above the softening range of the thermoplastic synthetic resin. In this way there are obtained a uniform wetting of the individual particles and also a complete covering of the expanded particles with the binding agent. The heating of the mixture is carried on—preferably while stirring—until the optimum expansion of the particles is achieved. The mixture can then be applied in a loose form, for example to wood, cardboard or metal, and allowed to cool while being subjected to light pressing together. Suitable binding agents which must not dissolve the expandable synthetic resin when molten by heating are for example bitumen, paraffins, waxes, colophony, shellac, synthetic resins, for example on the basis of cyclohexanone and formaldehyde, and other organic binding agents and mixtures of the said products with each other or with softeners, fillers, dyestuffs and the like. Solvents or diluents may also be added to the binding agents, but these must not dissolve the expandable synthetic resin.

The expandable individual particles of thermoplastic synthetic resins may be prepared by known methods. As examples of suitable thermoplastic synthetic resins there may be mentioned styrene polymers, such as polystyrene or copolymers of styrene with acrylonitrile, vinyl carbazole or other monovinyl compounds, or thermoplastic copolymers of styrene with small amounts of divinyl compounds such as divinyl benzene, also polymethacrylic acid methyl ester and polyvinyl chloride. Among the expanding agents which are to be contained in these thermoplastic synthetic resins there are especially preferred readily volatile liquids or gases which vaporize when the thermoplastic synthetic resin is heated to temperatures above its softening range. Other expanding agents may be used, however, for example gases under pressure, dissolved gases or compounds which split off gas. Readily volatile aliphatic or cycloaliphatic hydrocarbons having boiling points or boiling limits between about 0° and 58° C. are especially sutable for styrene polymers. The expandable particles of thermoplastic synthetic resins expand to a multiple of their original volume when heated to temperatures above their softening range. As a rule a heating to a temperature which is at most 30° to 50° C. above the softening range of the thermoplastic is sufficient, but higher temperatures may be used when using expanding agents which first become active at higher temperatures.

The ratio between expandable particles and binding agent may be varied within wide limits. As a rule 10 to 90 parts by weight of expandable synthetic resin particles are used with 90 to 10 parts of binding agent, the preferred proportions being 30 to 50 parts of synthetic resin particles to 70 to 50 parts of binding agent. A correspondingly different bulk density is obtained depending on the content of expandable synthetic resin particles. With a high proportion of binding agent, shaped articles are obtained which exhibit a higher compression strength.

The lightweight materials obtainable according to this invention can be used in a great variety of ways, for example as insulating material against cold, heat and sound, for filling up hollow spaces, for making boats unsinkable, as loft, roof and ceiling insulation, as floats, pipe casings, wall-coverings, decorative materials and the like. By cutting operations, for example by sawing, or also by means of a heated wire, articles having a definite shape can be made from the lightweight materials. The shaped articles may additionally be provided with a coating, for example with a flame-preventing coating, with a layer of lacquer or with mortar cement coverings. Various materials may also be stuck or otherwise applied to the light materials, for example plywood boards, plates of plastic, metal foils, fabrics, hardenable resins with glass fiber insertions, and the like.

The following examples will further illustrate this invention but the invention is not restricted to these examples. The parts specified in the examples are parts by weight.

*Example 1*

60 parts of bitumen having the melting point 55° C. are mixed with 40 parts of expandable finely-grained polystyrene (size of particles 2 to 3 millimetres) containing 8% of hexane as blowing agent. The mixture is heated at 105° C. for 15 minutes with mechanical stirring. A considerable increase in volume thus takes place. The mixture is then introduced into a rectangular hollow space lined with paper, pressed lightly and allowed to cool. A lightweight article is obtained which has a specific gravity of 0.13. The article is suitable as insulating material for a cold storage chamber. The expanded mixture can also be applied with a knife, for example on a flat roof.

*Example 2*

50 parts of paraffin wax of the melting point 53° C. and 30 parts of a resinous condensation product of cyclohexanone and formaldehyde, and also 80 parts of methyl polymethacrylate containing a blowing agent and of a particle size of 3 to 5 millimetres are mixed together. The mixture is heated to 115° C. while stirring for 30 minutes. The methyl polymethacrylate contains as blowing agent 10% of petroleum ether, of the boiling range 30° to 60° C. The mixture is then introduced into a hollow mold having a hemispherical hollow space and allowed to cool to room temperature under weak pressure. A lightweight article of hemispherical shape is taken out which has a specific gravity of 0.21. The lightweight material is suitable as decorative material.

*Example 3*

40 parts of bitumen of the melting point 60° are mixed with 60 parts of expandable finely-grained polystyrene (particle size 2 to 3 millimetres) containing as a blowing agent about 10% of petroleum ether of the boiling range 35° to 55° C. The mixture is heated to 100° C. for 10 minutes with mechanical stirring and then introduced into a heated spraygun. The contents of the spraygun are sprayed onto a flat surface through a nozzle 8 millimetres in diameter under the action of compressed air at 100° C. A closed shaped article is obtained. In the same way vertical walls or pipes can be covered or wrapped which are to be insulated for example against penetration of cold.

*Example 4*

50 parts of glue from hides are mixed with 50 parts of expandable, finely-particled polystyrene which contains about 10% of petroleum ether of the boiling range 35° to 55° C. and 1 part of hexamethylene tetramine. The mixture is heated to 100° C. with mechanical stirring for 20 minutes and introduced into a cylindrical hollow space, slightly pressed and cooled in this condition to a temperature below the softening range of polystyrene and below the softening range of the glue. A lightweight article of the specific gravity 0.15 is obtained from which profiled individual articles can be obtained by cutting operations. It is also possible to cut off thin layers from the cylindrical shaped article by a slicing machine. These are suitable for damping oscillations, as insulating material and the like.

I claim:
1. An improved process for the production of a lightweight expanded material which comprises: mixing (A) 10 to 90 parts by weight of expandable individual particles of a thermoplastic resin selected from the group consisting of polystyrene and polymethacrylic acid methyl ester, said resin containing a blowing agent capable of expanding said resin particles when softened, with (B) 90 to 10 parts by weight of a binding agent selected from the group consisting of bitumen and paraffin waxes having a melting point below the softening point of said resin particles; heating the resultant mixture to melt said binding agent, said resin being insoluble in said molten binding agent, whereby said expandable resin particles are uniformly coated with said binding agent; further heating the resultant mixture to soften and expand said individual coated resin particles; and placing said expanded particles in adhering contact with each other.

2. An improved process as defined in claim 1 wherein the thermoplastic resin is polystyrene.

3. An improved process as defined in claim 2 wherein the blowing agent is a volatile material selected from the group consisting of aliphatic and cycloaliphatic hydrocarbons having a boiling point between about 0° C. to 58° C. and which is incapable of dissolving said polystyrene.

4. An improved process as defined in claim 1 wherein the thermoplasitc resin is polymethacrylic acid methyl ester.

5. An improved process as defined in claim 2 in which there are 30 to 50 parts by weight of polystyrene to 70 to 50 parts by weight of said binding agent.

References Cited in the file of this patent

UNITED STATES PATENTS

| 2,398,049 | Schneider | Apr. 9, 1946 |
| 2,737,503 | Sprague et al. | Mar. 6, 1956 |
| 2,744,075 | Roberts | May 1, 1956 |
| 2,762,784 | Foust et al. | Sept. 11, 1956 |

FOREIGN PATENTS

| 578,513 | Great Britain | July 2, 1946 |